Jan. 19, 1932.　　　　F. E. DAVIS　　　　1,842,074
SPRING SUSPENSION FOR SIX-WHEEL VEHICLES
Filed Nov. 14, 1929　　　3 Sheets-Sheet 3
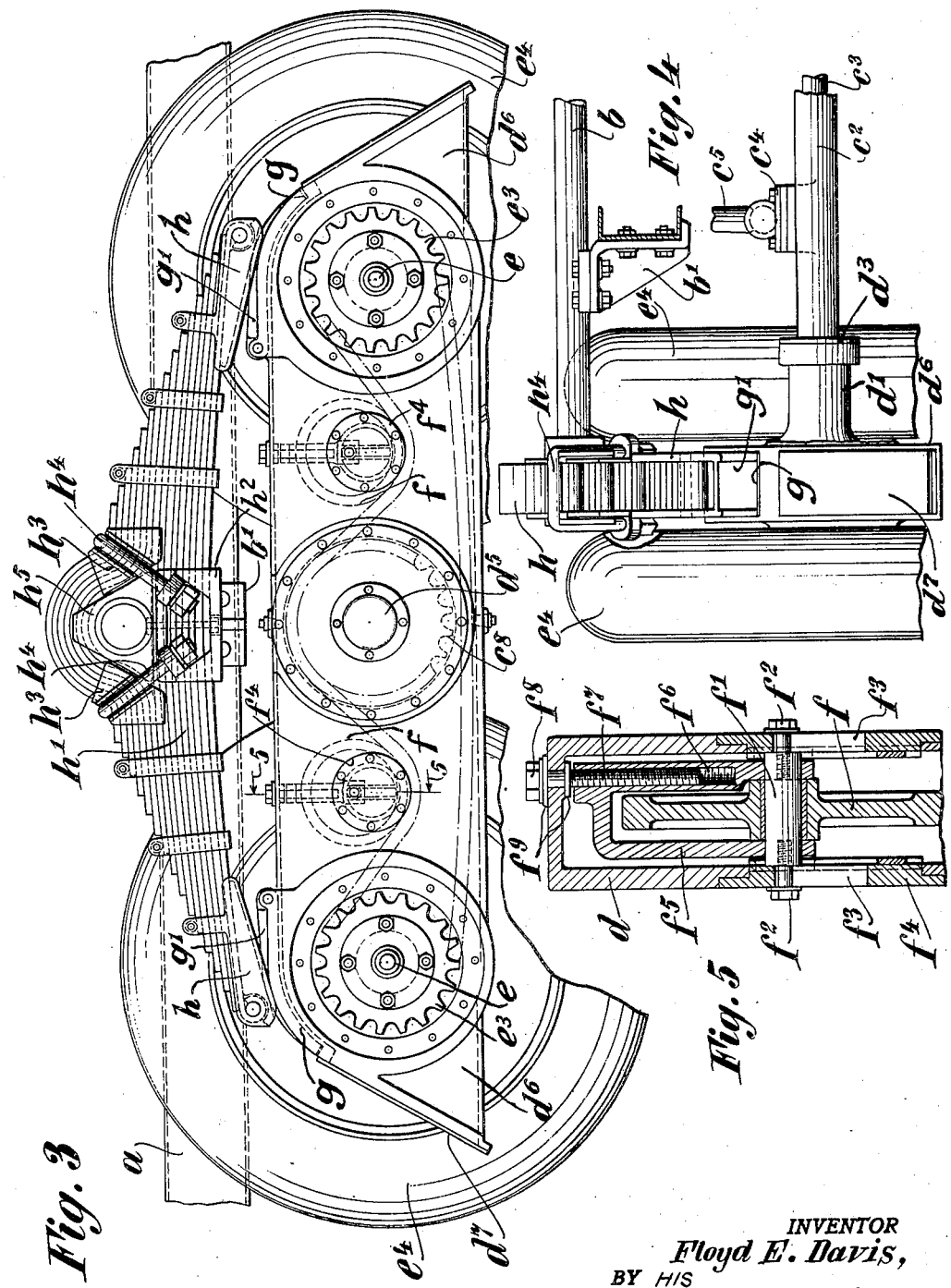
INVENTOR
Floyd E. Davis,
BY HIS
Redding, Greeley, O'Shea & Campbell
ATTORNEYS Patented Jan. 19, 1932

1,842,074

UNITED STATES PATENT OFFICE

FLOYD E. DAVIS, OF ALLENTOWN, PENNSYLVANIA, ASSIGNOR TO INTERNATIONAL MOTOR COMPANY, OF NEW YORK, N. Y., A CORPORATION OF DELAWARE

SPRING SUSPENSION FOR SIX WHEEL VEHICLES

Application filed November 14, 1929. Serial No. 407,054.

The present invention relates to drives for motor vehicles and embodies, more specifically, an improved chain drive in which the chain and related driving elements are totally enclosed in a housing which additionally carries the load of the vehicle.

It has been proposed, heretofore, to provide drives of this character and there are now available, designs in which a chain is utilized to drive forward and rear wheels mounted upon a common housing which serves to carry the load of the vehicle. With a view to improving the housing structure and manner of mounting the same upon the vehicle, as well as improving the spring suspension between such housing and the vehicle, the present invention has been designed and the resulting structure affords a more serviceable and efficient drive of this character.

An object of the invention, accordingly, is to provide an enclosed chain drive wherein the driving elements are carried within a pivoting housing and means is provided within such housing for transmitting the drive to the wheels in a more effective manner.

A further object of the invention is to provide a construction of the above character in which the weight of the vehicle is carried by the housing in an improved manner.

A further object of the invention is to provide an improved mounting for supporting the chain housing upon the axle housing of the vehicle.

Further objects, not specifically enumerated above, will be apparent as the invention is described in greater detail in connection with the accompanying drawings, wherein:

Figure 3 is a view in side elevation, showing the improved housing and spring suspension associated therewith, the outer wheels of the housing being removed in the interest of clearness.

Figure 4 is a view in end elevation, taken from the right in Figure 3, and with the right-hand wheels thereof removed in the interest of clearness.

Figure 5 is a view in section, taken on the line 5—5 of Figure 3, and looking in the direction of the arrows.

Figure 1:
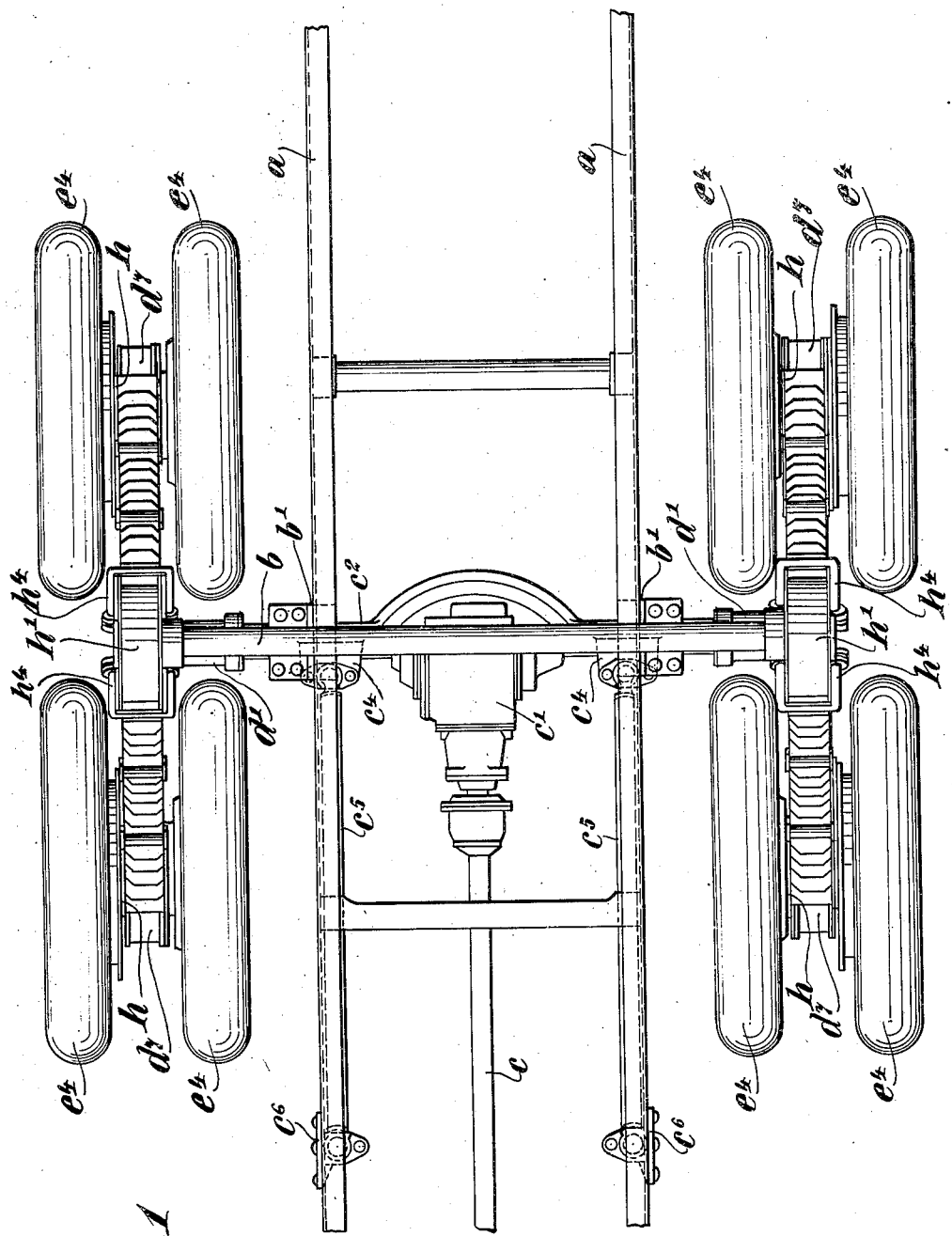
Figure 1 is a plan view showing a portion of a vehicle chassis provided with a drive construction in accordance with the present invention.
Figure 2:
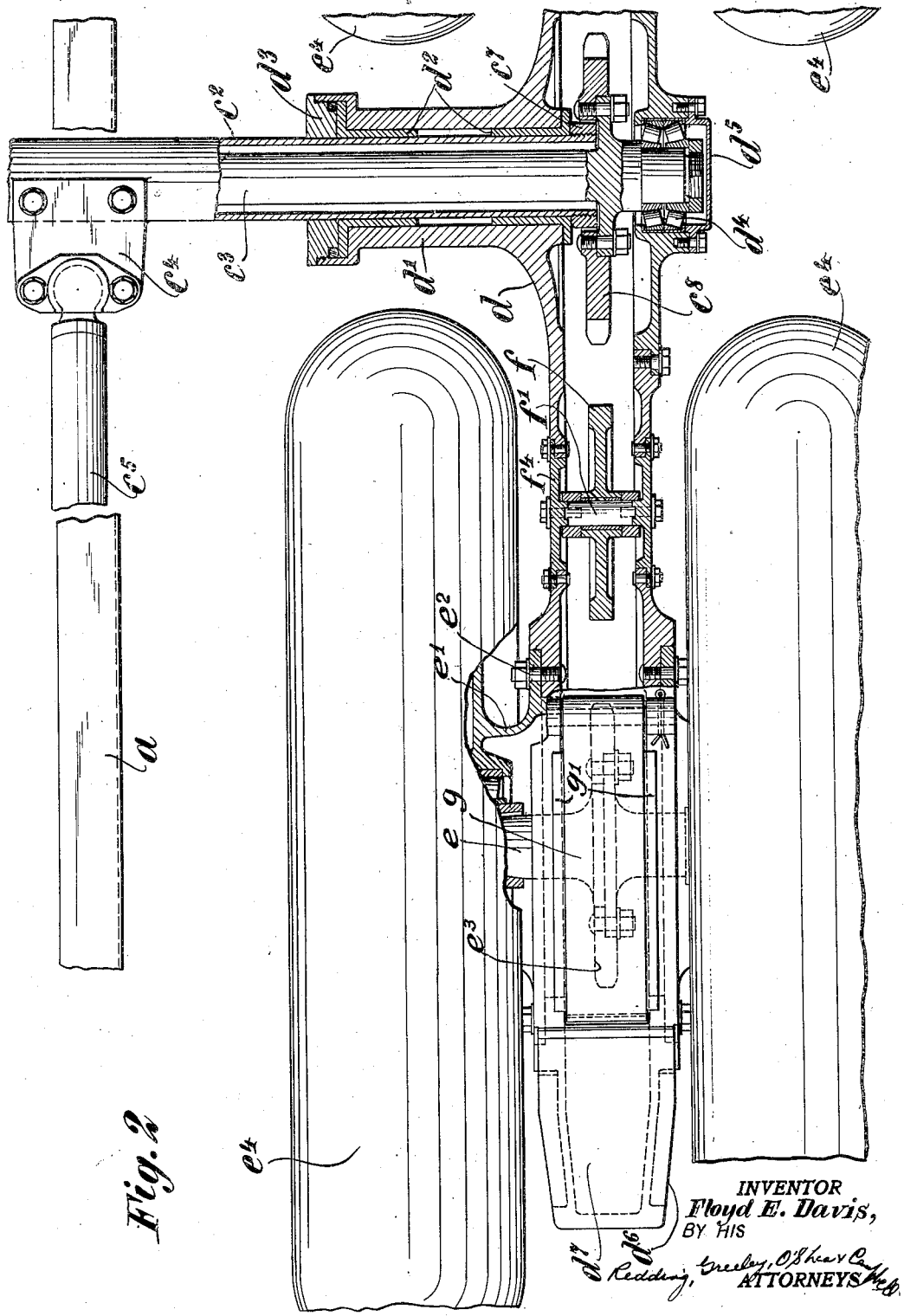
Figure 2 is an enlarged segmental view, partly broken away and in section showing the details of the housing structure and mounting means therefor.

Referring to the above drawings more specifically, $a$ designates the side frame members of a vehicle upon which an anchor tube $b$ is mounted. Suitable brackets $b'$ may be utilized to mount the anchor tube upon the frame and a propeller shaft $c$ transmits the drive from the power source to a differential $c'$ in the usual manner.

An axle housing $c^2$ carries live axle sections $c^3$ and connections $c^4$ which afford mountings for the rear ends of radius rods $c^5$. The forward ends of rods $c^5$ are mounted upon the frame members $a$ by means of suitable brackets $c^6$, these mountings forming no part of the present invention and not being discussed in greater detail herein.

Upon the outer ends of axle housings $c^2$, chain housings $d$ are mounted. These housings are formed as unit castings and are provided with sleeved extensions $d'$ which are mounted over the ends of axle housings $c^2$. Suitable bushings $d^2$ are mounted between the extensions $d'$ and axle housings $c^2$ and a packing nut $d^3$ is provided for securing the bushings in place. Threaded upon the ends of axle housings $c^2$, are nuts $c^7$ against which the bushings $d^2$ and sleeved extensions $d'$ abut. These nuts retain the housings $d$ upon the axle housings in a manner which will be readily apparent.

The outer ends of live axles $c^3$ are journaled in suitable bearings $d^4$, these bearings taking the radial reactions between the axles and housings. A cap $d^5$ is mounted over the exposed portion of this bearing to serve as a closure therefor and retain the bearing in position. A driving sprocket $c^8$ is carried at the outer end of the live axle section and transmits the drive through a chain indicated in dot and dash lines in Figure 3.

Stub axles $e$ are journaled within cylindrical bearing members $e'$ which are secured to the housings $d$ at $e^2$. These stub shafts carry driven sprockets $e^3$ and are engaged by the above mentioned chain to drive wheels $e^4$.

Within the housing, and between the driving and driven sprockets, idler sprockets $f$ are mounted. These sprockets are mounted upon shafts $f'$ carried by pins $f^2$ which are mounted in slots $f^3$ within suitable closures $f^4$ in the housing $d$. A U-shaped bracket $f^5$ is formed with a threaded portion $f^6$ within which an adjusting screw $f^7$ is received. A nut $f^8$, formed upon one extremity of the screw $f^7$, facilitates adjustment of the bracket $f^5$ and idler sprocket $f$ with respect to the housing $d$ and the chain. Spaced flanges $f^9$ secure the screw in a desired position with respect to the housing $d$.

At either end of the housing $d$, a track $g$ is formed. This track is provided with spaced flanges $g'$ between which a shoe $h$ is received. A spring $h'$, mounted upon anchor tube $b$, carries these shoes, the latter being fixedly secured to the ends of the spring.

In its preferred form, each spring $h'$ consists of a series of leaves retained by a clip member $h^2$ under the anchor tube, and a series of leaves formed to curve above the anchor tube and secured in position by clips $h^3$. U-bolts $h^4$ extend over the clips $h^3$ and secure them to the clip $h^2$. In this manner, the reenforcing upper leaves are effectively secured to the main leaves below the anchor tube, the entire being mounted upon a bearing member $h^5$ which is journaled on the anchor tube.

At either end of the housing $d$, sloping extensions $d^6$ are formed. These extensions afford a rest for a jack in order that the housing and load may be raised when it is necessary to change tires. Cover plates $d^7$ are secured to these extensions to facilitate inspection and repair of the driving elements carried within the housings. From the foregoing description, it will be apparent that a wheel mounting and drive has been provided which is of great strength, the elements thereof being simple of construction and readily assembled and repaired. The spring mounting effectively equalizes the load of the vehicle upon the ends of the housings and directly over the wheels. While the invention has been described with specific reference to the construction shown in the accompanying drawings, it is not limited save as defined in the appended claims.

What I claim is:

1. A drive for motor vehicles comprising fore and aft driving wheels, a housing mounting the wheels, an axle housing, means to mount the housing upon the axle housing, bearing tracks carried at either end of the housing, a spring journaled on the vehicle frame, and bearing shoes on the ends of the spring for engaging the tracks.

2. A drive for motor vehicles comprising fore and aft driving wheels, a housing mounting the wheels, an axle housing, means to mount the housing upon the axle housing, bearing tracks carried at either end of the housing, flanges on the housing at the sides of the tracks, a spring journaled on the vehicle frame, and bearing shoes on the ends of the spring for engaging the tracks.

3. A drive for motor vehicles comprising fore and aft driving wheels, a housing mounting the wheels, an axle housing, means to mount the housing upon the axle housing, a spring engaging the ends of the housing above the wheels, means for journaling the spring on the frame, and means for securing certain of the leaves of the spring above the journal and certain of the leaves below the journal.

This specification signed this 8th day of November, A. D. 1929.

FLOYD E. DAVIS.